US009428709B2

(12) United States Patent
Sutton et al.

(10) Patent No.: US 9,428,709 B2
(45) Date of Patent: *Aug. 30, 2016

(54) LUBRICATING COMPOSITION COMPRISING POLY (ISOBUTYLENE) /POLY (VINYL AROMATIC) BLOCK COPOLYMER

(75) Inventors: Michael R. Sutton, Matlock (GB); William R. S. Barton, Belper (GB); David Price, Littleover (GB)

(73) Assignee: The Lubrizol Corporation, Wickliffe, OH (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/118,359

(22) PCT Filed: May 21, 2012

(86) PCT No.: PCT/US2012/038750
§ 371 (c)(1),
(2), (4) Date: Nov. 18, 2013

(87) PCT Pub. No.: WO2012/162207
PCT Pub. Date: Nov. 29, 2012

(65) Prior Publication Data
US 2014/0274850 A1    Sep. 18, 2014

Related U.S. Application Data

(60) Provisional application No. 61/489,305, filed on May 24, 2011.

(51) Int. Cl.
| | | |
|---|---|---|
| *C10M 143/00* | (2006.01) | |
| *C10M 111/04* | (2006.01) | |
| *C10M 145/14* | (2006.01) | |
| *C10M 143/10* | (2006.01) | |
| *C08F 293/00* | (2006.01) | |

(52) U.S. Cl.
CPC ........ *C10M 143/10* (2013.01); *C08F 293/005* (2013.01); *C10M 143/00* (2013.01); *C08F 2438/01* (2013.01); *C10M 2205/026* (2013.01); *C10M 2205/04* (2013.01); *C10N 2220/021* (2013.01); *C10N 2230/04* (2013.01); *C10N 2240/04* (2013.01); *C10N 2240/042* (2013.01); *C10N 2240/08* (2013.01); *C10N 2240/10* (2013.01); *C10N 2240/101* (2013.01); *C10N 2240/102* (2013.01); *C10N 2240/104* (2013.01); *C10N 2240/105* (2013.01); *C10N 2240/14* (2013.01); *C10N 2240/40* (2013.01); *C10N 2260/02* (2013.01); *C10N 2270/00* (2013.01)

(58) Field of Classification Search
CPC ............ C10M 143/10; C10M 143/00; C10M 2205/04; C10M 2205/026; C08F 293/005; C08F 2438/01; C10N 2240/105; C10N 2260/02; C10N 2230/04; C10N 2240/40; C10N 2240/101; C10N 2240/04; C10N 2220/021; C10N 2270/00; C10N 2240/10; C10N 2240/08; C10N 2240/042; C10N 2240/104; C10N 2240/14; C10N 2240/102
USPC ........................................ 508/508, 118, 469
See application file for complete search history.

(56) References Cited

U.S. PATENT DOCUMENTS

| | | | |
|---|---|---|---|
| 3,948,868 A | 4/1976 | Powers | |
| 3,976,607 A | 8/1976 | Hokama et al. | |
| 3,992,310 A | 11/1976 | Forbes et al. | |
| 3,994,993 A | 11/1976 | Kennedy et al. | |
| 5,458,796 A * | 10/1995 | Storey et al. | 508/591 |
| 6,228,945 B1* | 5/2001 | Kennedy et al. | 525/241 |
| 6,265,486 B1 | 7/2001 | Shaffer et al. | |
| 8,354,362 B2* | 1/2013 | Price et al. | 508/508 |
| 2003/0166786 A1* | 9/2003 | Nakagawa et al. | 525/245 |
| 2009/0227703 A1* | 9/2009 | Puskas | 523/113 |
| 2010/0152082 A1* | 6/2010 | Price et al. | 508/508 |

FOREIGN PATENT DOCUMENTS

| | | |
|---|---|---|
| EP | 2080798 A1 | 7/2009 |
| WO | WO 2007121039 A2 * | 10/2007 |

OTHER PUBLICATIONS

Akhmedov, "Production of oils compounded with copolymers of isobutylene with dicyclopentadiene or [alpha]-methylstyrene", Chemistry and Technology of Fuels and Oils, 440-442, Jan. 1981; http://www.springerlink.com/content/VOL2451421321715/fulltext.pdf.

* cited by examiner

*Primary Examiner* — Pamela H Weiss
(74) *Attorney, Agent, or Firm* — Christopher P. Demas; Teresan W. Gilbert

(57) ABSTRACT

The invention provides a lubricating composition containing an oil of lubricating viscosity and a block copolymer of a poly(olefin) block, such as poly(isobutylene) (PIB) and a polyvinyl aromatic) block, such as poly(styrene), wherein the copolymer is optionally functionalized or grafted. The invention further provides a method of using the block copolymer to control deposits in a lubricating oil composition.

13 Claims, No Drawings

LUBRICATING COMPOSITION COMPRISING POLY (ISOBUTYLENE) /POLY (VINYL AROMATIC) BLOCK COPOLYMER

FIELD OF INVENTION

The present invention relates to lubricating compositions and particularly to lubricating compositions containing an oil of lubricating viscosity and a block copolymer of a poly(olefin) block and a poly(vinyl aromatic) block.

BACKGROUND OF THE INVENTION

The use of polymers as viscosity modifiers or dispersant viscosity modifiers (otherwise known as VM's) in an oil of lubricating viscosity is well known. A good VM will react to ambient temperatures to provide the desired level of viscosity modification. Poor performing VM's will cause, for example, undesirable increases in viscosity at low temperature, and/or undesirable effects upon degradation. For example, at high temperatures, such as those found in a piston cylinder, inefficient degradation of the viscosity modifier will result in burning of the degradants and carbon buildup in the cylinder. Away from high temperatures, inefficient degradation can lead to oxidation of the viscosity modifier, resulting in an undesirable increase in viscosity.

Limited cleanliness is often observed in engine piston deposits particularly for olefin copolymer viscosity modifiers, such as ethylene-propylene copolymers (OCP's). Although OCP's provide good low temperature performance, OCP's have a tendency to oxidize and also inefficiently degrade at high temperatures.

In contrast to OCP's, poly(vinyl aromatic) polymers (PVA polymers), such as poly(styrene), degrade much more efficiently, but are oil insoluble. Oil solubility can be imparted to PVA polymers, such as styrene, by copolymerization with a diene, such as butadiene. In fact, styrene butadiene copolymers have been investigated as viscosity modifiers or dispersant viscosity modifiers that have shown marked improvement in piston deposits over mainline ethylene-propylene copolymers. For example, U.S. Publication No. 2010/0152082 discloses styrene-butadiene block copolymers created by anionic polymerization. However, dienes do not degrade efficiently and need to be functionalized, for example, by the addition of pendant carbonyl groups.

It is known that poly(isobutylene) (PIB) will not oxidize and will efficiently degrade at high temperatures. However, PIB's do not exhibit good thickening performance and exhibit poor low temperature performance.

A copolymer capable of being used as a VM that can provide at least one of acceptable low temperature performance and/or cleanliness and that can be produced simply is desired.

SUMMARY OF THE INVENTION

It has been found that copolymers of vinyl aromatics, such as styrene, and isobutylene provide good VM performance, and exceptional degradation performance. As such, the present invention provides a poly(vinyl aromatic)-poly (isobutylene) (PVA-PIB) block copolymer of, for example, poly(styrene)-poly(isobutylene) (PS-PIB), for use in lubricating compositions.

The present invention, in one embodiment, provides a lubricating composition comprising an oil of lubricating viscosity and a PVA-PIB block copolymer. The PVA-PIB block copolymer may or may not be a tapered block copolymer and comprised of at least one PIB block (block A) and at least one PVA block (block B), wherein the mole ratio of block A/(block A+B) is 0.5 to 0.97. In one embodiment, the PVA of Block B can be poly(styrene) (PS). As used herein the phrase 'mole ratio of block A/(block A+B)' means the ratio of the moles of repeat units in block A divided by the sum of repeat units in (block A+block B). Repeat units refers to monomer derived units in the polymer.

In one embodiment the invention provides a lubricating composition comprising an oil of lubricating viscosity, a PVA-PIB copolymer as disclosed herein and at least one additive including a dispersant, an antioxidant, an antiwear agent, a friction modifier or mixtures thereof.

In one embodiment the lubricating composition comprises an oil of lubricating viscosity, a PS-PIB copolymer as disclosed herein and a dispersant, or mixtures thereof.

In one embodiment the lubricating composition comprises an oil of lubricating viscosity, a PVA-PIB copolymer as disclosed herein and an antioxidant, or mixtures thereof.

In one embodiment the lubricating composition comprises an oil of lubricating viscosity, a PVA-PIB copolymer as disclosed herein and an antiwear agent, or mixtures thereof.

In one embodiment the lubricating composition comprises an oil of lubricating viscosity, a PVA-PIB copolymer as disclosed herein and a friction modifier, or mixtures thereof.

In one embodiment the lubricant composition as described herein for an internal combustion engine has reduced amounts of at least one of sulfur, phosphorus and sulfated ash.

In one embodiment the invention provides for the use of the lubricating composition in an engine oil for a 2-stroke or a 4-stroke internal combustion engine, a gear oil, an automatic transmission oil, a hydraulic fluid, a turbine oil, a metal working fluid, or a circulating oil.

DETAILED DESCRIPTION OF THE INVENTION

The present invention provides block copolymers of a PVA polymer and PIB for use in lubricating compositions. The copolymers of the current invention include a block "A" of PIB and a block "B" of PVA.

While the block B PVA may be chosen based on the needs of the particular application, in one embodiment, the PVA of block B can comprise monomers of styrene. The PVA may also be comprised of substituted styrenes, such as, for example, the methyl styrenes, alpha-halostyrenes, lower alkyl-substituted styrenes such as alpha-methylstyrene, alpha-ethylstyrene, para-tert-butylstyrene and para-lower alkoxystyrenes. Difunctional vinyl aromatic monomers, such as divinylbenzene, may also be present in small amounts. Di- (and higher) functional monomers can be used to prepare cross-linked and star polymers and may be used in an amount up to 5% of the polymer composition. In one embodiment, the polymer is free of (or substantially free of) polyfunctional vinyl aromatic monomers.

The Block A PIB can depolymerize cleanly while imparting oil solubility to Block B. The Block B PVA can impart shear stability, good low temperature properties, and thickening to a lubricating formulation and desirably depolymerize cleanly. Thus, the amount of Block A and Block B present in the copolymer can be attenuated based on the needs of the lubricating fluid. Preferably, the mole ratio of block A/(block A+B) is 0.5 to 0.97, but could also be 0.7 to 0.95, or 0.75 to 0.9. As used herein the phrase 'mole ratio of block A/(block A+B)' means the ratio of the moles of repeat units in block A divided by the sum of repeat units in (block A+block B).

In various embodiments of the invention, the architecture of the block polymer can be linear, branched or star and the blocks can be arranged in regular, random, sequential, tapered or alternating order. The block copolymer may be either a di-block AB copolymer, or a tri-block ABA or BAB copolymer. In one embodiment, the copolymer may be a linear regular copolymer. In another embodiment, the copolymer can be a diblock sequential block copolymer or a diblock star copolymer. As used herein the term 'sequential block copolymer' means that the copolymer consists of discrete blocks (A and B), each being homogenous, i.e. made up of a single monomer. Examples of a sequential block copolymer include those with A-B or B-A-B architecture.

The PIB block of the invention may, in some embodiments, include a small amount of a diene. In relation to the content of block A in the copolymer, the diene content may be present at less than 10 mol %, or less than 5 mol %, or less than 2 mol %. Suitable dienes include, for example, 1,4-butadiene or isoprene. In some embodiments, block A may be substantially free or even completely free of dienes. As used herein the term "substantially free of dienes" means the polymer contains a diene derived unit at not more than impurity levels, typically, less than 1 mol % of the polymer, or 0.05 mol % or less of the polymer, or 0.01 mol % or less of the polymer, or 0 mol % of the polymer. When the block copolymer includes a diene, the diene may be branched or linear and the copolymer may be hydrogenated or unhydrogenated.

In one embodiment either or both of the isobutylene monomer of block A and the vinyl aromatic monomer of block B may be functionalized with a group including acyl groups or halo-, alkoxy-, carboxy-, hydroxy-, sulfonyl-, nitro-, nitroso-, and hydrocarbyl-substituents wherein the hydrocarbyl group typically has 1 to 12 carbon atoms.

In another embodiment either or both of the isobutylene monomer of block A and the vinyl aromatic monomer of block B may be grafted with an ethylenically unsaturated acylating agent. Grafting may occur by halogenating (e.g. brominating) vinylic carbons on the PVA-PIB backbone, and then reacting the halogenated vinylic carbons with a carboxylic acid or derivative thereof in the presence of an activating agent, for example, as taught in WO/2011/005739 to Price et al., published Jan. 13, 2011.

Acylated polymers may be further functionalized with an amine or polyamine. In one embodiment, the amine comprises an aromatic amine, for carbon buildup control or fuel economy. In one embodiment, the amine may be an aliphatic amine, for acceptable carbon buildup and/or sludge handling.

The weight average molecular weight of the copolymer can be from 1000 to 1,000,000, or 5,000 to 500,000, or 10,000 to 250,000, or 50,000 to 175,000. In different embodiments the polydispersity of the copolymer typically ranges from 1 to less than 1.6, or 1 to 1.55, or 1 to 1.4, or 1.01 to 1.2.

The copolymers of the invention can be produced in any manner known to one skilled in the art. For example, living cationic polymerization, as taught for example in *Principles of Polymerization*, by George Odian 3$^{rd}$ Edition pp 356, can provide a quick and customizable route to obtaining a product having a relatively high amount of vinyl aromatic derived units, e.g., styrene, compared to other methods. Another technique that can provide a method of introducing new functionality to the PIB block in a controlled manner can be ATRP polymerization, as taught, for example, in *Handbook of Radical Polymerization*, edited by Krzysztof Matyjaszewski pp 523, ATRP polymerization can provide a copolymer with lower amounts of vinyl aromatic derived units. The inventors have discovered that by employing different processes to produce the PIB-PVA block copolymers, the PVA content of the copolymer can be controlled, thereby affording block copolymers exhibiting varying degrees of decomposition.

Oil of Lubricating Viscosity

The composition comprises an oil of lubricating viscosity. Such oils include natural and synthetic oils, oil derived from hydrocracking, hydrogenation, and hydrofinishing, unrefined, refined and re-refined oils and mixtures thereof.

Unrefined oils are those obtained directly from a natural or synthetic source generally without (or with little) further purification treatment. Refined oils are similar to the unrefined oils except they have been further treated in one or more purification steps to improve one or more properties. Purification techniques are known in the art and include solvent extraction, secondary distillation, acid or base extraction, filtration, percolation and the like.

Re-refined oils are also known as reclaimed or reprocessed oils, and are obtained by processes similar to those used to obtain refined oils and often are additionally processed by techniques directed to removal of spent additives and oil breakdown products.

Natural oils useful in making the inventive lubricants include animal oils, vegetable oils (e.g., castor oil, lard oil), mineral lubricating oils such as liquid petroleum oils and solvent-treated or acid-treated mineral lubricating oils of the paraffinic, naphthenic or mixed paraffinic-naphthenic types and oils derived from coal or shale or mixtures thereof.

Synthetic lubricating oils are useful and include hydrocarbon oils such as polymerized and interpolymerized olefins (e.g., polybutylenes, polypropylenes, propyleneisobutylene copolymers); poly(1-hexenes), poly(1-octenes), poly(1-decenes), and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); alkylated diphenyl ethers and alkylated diphenyl sulfides and the derivatives, analogs and homologs thereof or mixtures thereof.

Other synthetic lubricating oils include liquid esters of phosphorus-containing acids (e.g., tricresyl phosphate, trioctyl phosphate, and the diethyl ester of decane phosphonic acid), and polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

Oils of lubricating viscosity may also be defined as specified in the American Petroleum Institute (API) Base Oil Interchangeability Guidelines. The five base oil groups are as follows: Group I (sulfur content >0.03 wt %, and/or <90 wt % saturates, viscosity index 80-120); Group II (sulfur content ≤0.03 wt %, and ≥90 wt % saturates, viscosity index 80-120); Group III (sulfur content ≤0.03 wt %, and ≥90 wt % saturates, viscosity index ≥120); Group IV (all polyalphaolefins (PAOs)); and Group V (all others not included in Groups I, II, III, or IV). The oil of lubricating viscosity comprises an API Group I, Group II, Group III, Group IV, Group V oil or mixtures thereof. Often the oil of lubricating viscosity is an API Group I, Group II, Group III, Group IV oil or mixtures thereof. Alternatively the oil of lubricating viscosity is often an API Group I, Group II, Group III oil or mixtures thereof.

The lubricant composition may be in the form of a concentrate and/or a fully formulated lubricant. If the polymer of the present invention is in the form of a concentrate (which may be combined with additional oil to form, in whole or in part, a finished lubricant), the ratio of the polymer to the oil of lubricating viscosity and/or to diluent oil include the ranges of 1:99 to 99:1 by weight, or 80:20 to 10:90 by weight.

Other Performance Additives

The composition optionally comprises other performance additives. The other performance additives comprise at least one of metal deactivators, conventional detergents (detergents prepared by processes known in the art), dispersants, viscosity modifiers, friction modifiers, antiwear agents, corrosion inhibitors, dispersant viscosity modifiers, extreme pressure agents, antiscuffing agents, antioxidants, foam inhibitors, demulsifiers, pour point depressants, seal swelling agents and mixtures thereof. Typically, fully-formulated lubricating oil will contain one or more of these performance additives.

Dispersants

Dispersants are often known as ashless-type dispersants because, prior to mixing in a lubricating oil composition, they do not contain ash-forming metals and they do not normally contribute any ash forming metals when added to a lubricant and polymeric dispersants. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include PIB succinimide with number average molecular weight of the PIB substituent in the range 350 to 5000, or 500 to 3000. Succinimide dispersants and their preparation are disclosed, for instance in U.S. Pat. No. 4,234,435. Succinimide dispersants are typically the imide formed from a polyamine, typically a poly(ethyleneamine) or an aromatic polyamine, such as amino diphenylamine (ADPA).

In one embodiment the invention further comprises at least one PIB succinimide dispersant derived from PIB with number average molecular weight in the range 350 to 5000, or 500 to 3000. The PIB succinimide may be used alone or in combination with other dispersants.

In one embodiment the invention further comprises at least one dispersant derived from PIB succinic anhydride, an amine and zinc oxide to form a PIB succinimide complex with zinc. The PIB succinimide complex with zinc may be used alone or in combination.

Another class of ashless dispersant is Mannich bases. Mannich dispersants are the reaction products of alkyl phenols with aldehydes (especially formaldehyde) and amines (especially polyalkylene polyamines). The alkyl group typically contains at least 30 carbon atoms.

The dispersants may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, phosphorus compounds and/or metal compounds.

The dispersant may be present at 0 wt % to 20 wt %, or 0.1 wt % to 15 wt %, or 0.1 wt % to 10 wt %, or 1 wt % to 6 wt %, or 7 wt % to 12 wt % of the lubricating composition.

Detergents

The lubricant composition optionally further comprises other known neutral or overbased detergents. Suitable detergent substrates include phenates, sulfur containing phenates, sulfonates, salixarates, salicylates, carboxylic acid, phosphorus acid, mono- and/or di-thiophosphoric acid, alkyl phenol, sulfur coupled alkyl phenol compounds, or saligenins. Various overbased detergents and their methods of preparation are described in greater detail in numerous patent publications, including WO2004/096957 and references cited therein.

The detergent may be present at 0 wt % to 10 wt %, or 0.1 wt % to 8 wt %, or 1 wt % to 4 wt %, or greater than 4 to 8 wt %.

Antioxidants

Antioxidant compounds are known and include for example, sulfurized olefins, diarylamines, hindered phenols, molybdenum compounds (such as molybdenum dithiocarbamates), and mixtures thereof. Antioxidant compounds may be used alone or in combination. The antioxidant may be present in ranges 0 wt % to 20 wt %, or 0.1 wt % to 10 wt %, or 1 wt % to 5 wt %, and in some cases from 1.5 wt % to 3.0 wt % of the lubricating composition.

The hindered phenol antioxidant often contains a secondary butyl and/or a tertiary butyl group as a sterically hindering group. The phenol group is often further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant is an ester and may include, e.g., Irganox™ L-135 from Ciba. A more detailed description of suitable ester-containing hindered phenol antioxidant chemistry is found in U.S. Pat. No. 6,559,105.

Diarylamine antioxidants may contain one or more nitrogen atoms. The aryl groups may be between two nitrogen atoms or one nitrogen atom may have two aryl groups attached thereto. Substituents for the aryl group in diarylamine antioxidants can include aliphatic hydrocarbon groups such as alkyl having from 1 to 30 carbon atoms, hydroxy groups, halogen radicals, carboxylic acid or ester groups, or nitro groups. Preferably the aryl group may be substituted or unsubstituted phenyl or naphthyl. One or both aryl groups may be substituted, e.g. mono-alkylated diphenylamine, di-alkylated diphenylamine, or mixtures of mono- and di-alkylated diphenylamines. Suitable examples of diarylamines that may be used include, but are not limited to, diphenylamine and alkylated diphenylamines, phenyl-naphthylamine and alkylated phenyl-naphthylamines, and mixtures thereof.

Suitable examples of molybdenum dithiocarbamates which may be used as an antioxidant include commercial materials sold under the trade names such as Molyvan 822™ and Molyvan™ A from R. T. Vanderbilt Co., Ltd., and Adeka Sakura-Lube™ S-100, S-165 and S-600 from Asahi Denka Kogyo K. K and mixtures thereof.

Viscosity Modifiers

Although the polymers of the present invention may serve as viscosity modifiers, additional viscosity modifiers of other types may also be present. Such viscosity modifiers are well known materials and include hydrogenated styrene-butadiene rubbers, ethylene-propylene copolymers, hydrogenated styrene-isoprene polymers, hydrogenated radical isoprene polymers, poly(meth)acrylates (often polyalkylmethacrylates), polyalkyl styrenes, polyolefins and esters of maleic anhydride-styrene copolymers, or mixtures thereof. Such additional viscosity modifiers may be present in ranges including 0 wt % to 15 wt %, or 0.1 wt % to 10 wt %, or 1 wt % to 5 wt %, or in some cases from 0.5 wt % to 2 wt % of the lubricating composition.

Antiwear Agents

The lubricant composition optionally further comprises at least one other antiwear agent. The antiwear agent may be present in ranges including 0 wt % to 15 wt %, or 0.1 wt % to 10 wt % or 1 wt % to 8 wt %, or in some cases from 0.5 wt % to 2 wt % of the lubricating composition. Examples of suitable antiwear agents include phosphate esters, sulfurized olefins, sulfur-containing ashless anti-wear additives are metal dihydrocarbyldithiophosphates (such as zinc dialkyldithiophosphates), thiocarbamate-containing compounds, such as thiocarbamate esters, thiocarbamate amides, thiocarbamic ethers, alkylene-coupled thiocarbamates, and bis (S-alkyldithiocarbamyl) disulfides.

The dithiocarbamate-containing compounds may be prepared by reacting a dithiocarbamate acid or salt with an unsaturated compound. The dithiocarbamate containing compounds may also be prepared by simultaneously reacting an amine, carbon disulfide and an unsaturated compound. Generally, the reaction occurs at a temperature of 25° C. to 125° C. U.S. Pat. Nos. 4,758,362 and 4,997,969 describe dithiocarbamate compounds and methods of making them.

Examples of suitable olefins that may be sulfurized to form an the sulfurized olefin include propylene, butylene, isobutylene, pentene, hexane, heptene, octane, nonene, decene, undecene, dodecene, undecyl, tridecene, tetradecene, pentadecene, hexadecene, heptadecene, octadecene, octadecenene, nonodecene, eicosene or mixtures thereof. In one embodiment, hexadecene, heptadecene, octadecene, octadecenene, nonodecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes fatty acids and their esters. The fatty acids are often obtained from vegetable oil or animal oil; and typically contain 4 to 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. In one embodiment fatty acids and/or ester are mixed with olefins.

In an alternative embodiment, the ashless antiwear agent may be a monoester of a polyol and an aliphatic carboxylic acid, often an acid containing 12 to 24 carbon atoms. Often the monoester of a polyol and an aliphatic carboxylic acid is in the form of a mixture with a sunflower oil or the like, which may be present in the friction modifier mixture include 5 to 95, or in other embodiments 10 to 90, or 20 to 85, or 20 to 80 weight percent of said mixture. The aliphatic carboxylic acids (especially a monocarboxylic acid) which form the esters are those acids typically containing 12 to 24 or 14 to 20 carbon atoms. Examples of carboxylic acids include dodecanoic acid, stearic acid, lauric acid, behenic acid, and oleic acid.

Polyols include diols, triols, and alcohols with higher numbers of alcoholic OH groups. Polyhydric alcohols include ethylene glycols, including di-, tri- and tetraethylene glycols; propylene glycols, including di-, tri- and tetrapropylene glycols; glycerol; butane diol; hexane diol; sorbitol; arabitol; mannitol; sucrose; fructose; glucose; cyclohexane diol; erythritol; and pentaerythritols, including di- and tripentaerythritol. Often the polyol is diethylene glycol, triethylene glycol, glycerol, sorbitol, pentaerythritol or dip entaerythritol.

The commercially available monoester known as "glycerol monooleate" is believed to include 60±5 percent by weight of the chemical species glycerol monooleate, along with 35±5 percent glycerol dioleate, and less than 5 percent trioleate and oleic acid. The amounts of the monoesters, described above, are calculated based on the actual, corrected, amount of polyol monoester present in any such mixture.

Antiscuffing Agents

The lubricant composition may also contain an antiscuffing agent. Antiscuffing agent compounds are believed to decrease adhesive wear are often sulfur-containing compounds. Typically the sulfur-containing compounds include organic sulfides and polysulfides, such as dibenzyldisulfide, bis-(chlorobenzyl)disulfide, dibutyl tetrasulfide, di-tertiary butyl polysulfide, sulfurized methyl ester of oleic acid, sulfurized alkylphenol, sulfurized dipentene, sulfurized terpene, sulfurized Diels-Alder adducts, alkyl sulfenyl N'N-dialkyl dithiocarbamates, the reaction product of polyamines with polybasic acid esters, chlorobutyl esters of 2,3-dibromopropoxyisobutyric acid, acetoxymethyl esters of dialkyl dithiocarbamic acid and acyloxyalkyl ethers of xanthogenic acids and mixtures thereof.

Extreme Pressure Agents

Extreme Pressure (EP) agents that are soluble in the oil include sulfur- and chlorosulfur-containing EP agents, chlorinated hydrocarbon EP agents and phosphorus EP agents. Examples of such EP agents include chlorinated wax; organic sulfides and polysulfides such as dibenzyldisulfide, bis-(chlorobenzyl)disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbon and trihydrocarbon phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid; the zinc salts of a phosphorodithioic acid; amine salts of alkyl and dialkylphosphoric acids, including, for example, the amine salt of the reaction product of a dialkyldithiophosphoric acid with propylene oxide; and mixtures thereof.

Other Additives

Other performance additives such as corrosion inhibitors include those described in paragraphs 5 to 8 of U.S. application Ser. No. 05/038,319 (filed on Oct. 25, 2004 McAtee and Boyer as named inventors), octylamine octanoate, condensation products of dodecenyl succinic acid or anhydride and a fatty acid such as oleic acid with a polyamine. In one embodiment the corrosion inhibitors include the Synalox® corrosion inhibitor. The Synalox corrosion inhibitor is typically a homopolymer or copolymer of propylene oxide. The Synalox® corrosion inhibitor is described in more detail in a product brochure with Form No. 118-01453-0702 AMS, published by The Dow Chemical Company. The product brochure is entitled "SYNALOX Lubricants, High-Performance Polyglycols for Demanding Applications."

Metal deactivators including derivatives of benzotriazoles, dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides; and friction modifiers including fatty alkyl components such as fatty acid derivatives such as amines, esters, epoxides, fatty imidazolines, condensation products of carboxylic acids and polyalkylene-polyamines and amine salts of alkylphosphoric acids may also be used in the lubricant composition. Fatty alkyl generally means $C_{10}$ to $C_{22}$ alkyl, typically straight chained, and optionally unsaturated. Friction modifiers may be present in ranges including 0 wt % to 10 wt % or 0.1 wt % to 8 wt % or 1 wt % to 5 wt % of the lubricating composition.

INDUSTRIAL APPLICATION

The copolymer of the invention is suitable for any lubricant composition. The polymer may be employed as a viscosity modifier and/or a dispersant viscosity modifier (often referred to as a DVM).

In one embodiment the polymer of the invention provides at least one of acceptable viscosity modifying performance, acceptable dispersant performance, and acceptable carbon buildup and sludge handling. When the polymer of the invention is used in an engine oil lubricant composition, it typically further provides acceptable fuel economy performance or acceptable carbon buildup and sludge handling.

Examples of a lubricant include an engine oil for a 2-stroke or a 4-stroke internal combustion engine, a gear oil, an automatic transmission oil, a hydraulic fluid, a turbine oil, a metal working fluid or a circulating oil.

In one embodiment the internal combustion engine may be a diesel fuelled engine, a gasoline fuelled engine, a natural gas fuelled engine or a mixed gasoline/alcohol fuelled engine. In one embodiment the internal combustion engine is a diesel fuelled engine and in another embodiment a gasoline fuelled engine.

The internal combustion engine may be a 2-stroke or 4-stroke engine. Suitable internal combustion engines include marine diesel engines, aviation piston engines, low-load diesel engines, and automobile and truck engines.

The lubricant composition for an internal combustion engine may be suitable for any engine lubricant irrespective of the sulfur, phosphorus or sulfated ash (ASTM D-874) content. The sulfur content of the engine oil lubricant may be from 0.01 wt % to 1 wt %, or 0.01 wt % to 0.8 wt %, or 0.01 wt % to 0.5 wt %, or 0.01 wt % to 0.3 wt %. Likewise, the engine oil may not have any sulfur content. The phosphorus content of the engine oil may be from 0.01 wt % to 0.2 wt %, or 0.01 wt % to 0.1 wt %, or 0.01 wt % to 0.085 wt %, or even 0.01 wt % to 0.06 wt %, or 0.01 wt % to 0.055 wt %, or 0.01 wt % to 0.05 wt %. Likewise, the engine oil may not contain any phosphorus. The total sulfated ash content may be from 0.01 wt % to 2 wt %, or 0.01 wt % to 1.5 wt %, or 0.01 wt % to 1.1 wt %, or 0.01 wt % to 1 wt %, or 0.01 wt % to 0.8 wt %, or 0.01 wt % to 0.5 wt %. Likewise, the engine oil may be free of, or substantially free of, any sulfated ash content.

In one embodiment the lubricating composition is an engine oil, wherein the lubricating composition has a (i) a sulfur content of 0.5 wt % or less, (ii) a phosphorus content of 0.1 wt % or less, and (iii) a sulfated ash content of 1.5 wt % or less.

In one embodiment the lubricating composition is suitable for a 2-stroke or a 4-stroke marine diesel internal combustion engine. In one embodiment the marine diesel combustion engine is a 2-stroke engine. The polymer of the invention may be added to a marine diesel lubricating composition at 0.01 to 20 wt %, or 0.05 to 10 wt %, or 0.1 to 5 wt %.

In several embodiments a suitable lubricating composition comprises additives present on an actives basis in ranges as shown in Table 1a and 1b.

TABLE 1a

|  | Embodiments (wt % of lubricant composition) | | | |
|---|---|---|---|---|
|  | A | B | C | D |
| Unfunctionalized Polymer | 0.01-50 | 0.1-40 | 0.3-30 | 0.5-20 |
| Other Performance Additives | 0-49 | 0.01-45 | 0.3-30 | 1.5-20 |
| Oil of Lubricating Viscosity | 1-99.99 | 15-99.89 | 40-99.4 | 60-98 |

TABLE 1b

|  | Embodiments (wt % of lubricant composition) | | | |
|---|---|---|---|---|
|  | A | B | C | D |
| Functionalized Polymer | 0.01-25 | 0.1-20 | 0.3-10 | 0.5-5 |
| Other Performance Additives | 0-49 | 0.01-45 | 0.3-30 | 1.5-20 |
| Oil of Lubricating Viscosity | 26-99.99 | 35-99.89 | 40-99.4 | 45-98 |

The following examples provide an illustration of the invention. These examples are non exhaustive and are not intended to limit the scope of the invention.

EXAMPLES

Example 1

Living Cationic Polymerization

A PS-PIB copolymer was prepared via living cationic polymerization with a cumyl chloride initiator and a $TiCl_4$ promoter according to the reaction diagram below. The resultant copolymer had approximately 19.4 mol % styrene and 80.6 mol % isobutylene, Mw of 13900, Mn of 11200 and a polydispersity of 1.23.

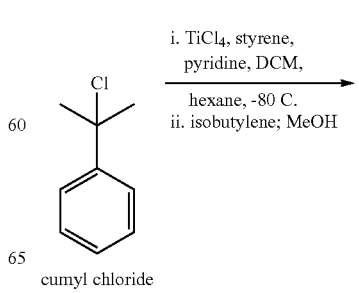

cumyl chloride

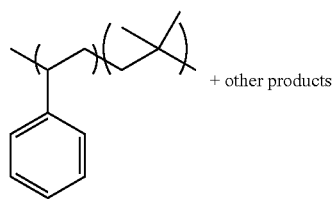 + other products

Example 2

ATRP Polymerization

A PS-PIB copolymer was prepared from high vinylidene 5000 Mn PIB by hydroboration conversion to an ATRP macroinitiator and finally conversion to styrene-b-isobutylene according to the schemes diagramed below. The resultant copolymer had approximately 4.7 mol % styrene and 95.3 mol % isobutylene, Mw of 10600 and Mn of 8600.

Scheme 1: Conversion of HR PIB to hydroxyl-PIB

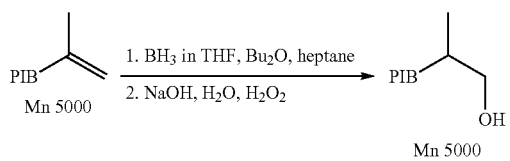

Scheme 2: Conversion of hydroxyl-PIB to PIB ATRP macroinitator

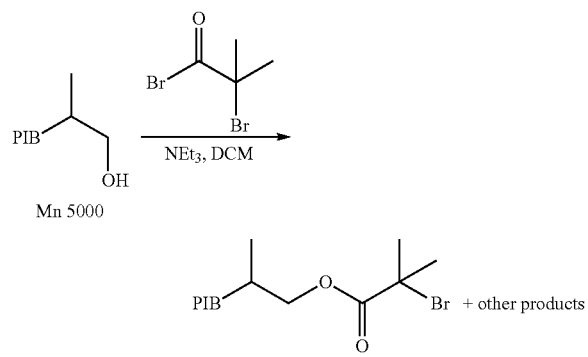

Scheme 3: Conversion of PIB ATRP macoinitiator to styrene-b-isobutylene diblock copolymer

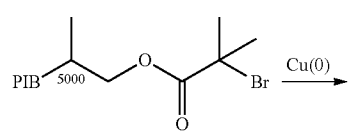

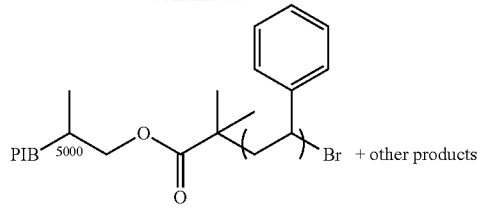 + other products

Example 3

Thermogravimetric Analysis (TGA)

To determine the type, rate and extent of thermal decomposition of PS-PIB copolymers, TGA was used to compare the products produced according to the processes of Examples 1 and 2 relative to samples of PIB (Mw 37,000, approx. 40-50% highly-reactive PIB), styrene-butadiene rubber (SBR)(Mw 130,000, approx. 29 mol % styrene) and OCP (Mw 130,000).

Methods:

(1) thermal degradation in Nitrogen—Hi. Res. Sensitivity 1.0, Ramp 10° C./min, res. 5 to 550° C., Switch to air, Ramp 10° C./min, res. 5 to 600° C., (2) Isothermal at 285° C.-Ramp 30° C./min to 285° C., Switch to air, isothermal for 1440 min.

Results:

(1) Based on temperature at which 1-4% polymer remains (Table 1), both PS-PIB products (Rank 2 and 3) exhibit performance close to PIB (Rank 1). Both PS-PIB copolymers perform much better than OCP (Rank 5) and SBR (Rank 4). PS-PIB synthesized via the ATRP route (Rank 2) was a better performer than the copolymer synthesized via living cationic polymerisation (Rank 3). Based on inorganic residue (Table 2), the copolymers of the invention ranked 2 and tied for 4. PIB is generally known to decompose cleanly and it was speculated that the lower styrenic content of the ATRP copolymer accounted for the difference in performance from the living cationic copolymer.

TABLE 1

VM ranking according to lowest temperature at which 1, 2, 3 or 4% residue remained

|  | Relative Ranks | | | | |
| --- | --- | --- | --- | --- | --- |
|  | 1% | 2% | 3% | 4% | Final Rank |
| OCP | 5 | 5 | 5 | 5 | 5 |
| SBR | 4 | 4 | 4 | 4 | 4 |
| PIB | 1 | 1 | 1 | 1 | 1 |
| PS-PIB (living cat) | 3 | 3 | 3 | 3 | 3 |
| PS-PIB (ATRP) | 2 | 2 | 2 | 2 | 2 |

TABLE 2

VM ranking according to final inorganic residue at 600° C.

|  | Final Residue (%) | Rank |
| --- | --- | --- |
| OCP | 0.27 | 3 |
| SBR | 0.41 | 4 |
| PIB | 0.01 | 1 |
| PS-PIB (living cat) | 0.41 | 4 |
| PS-PIB (ATRP) | 0.02 | 2 |

(2) The isothermal experiment was designed to mimic behavior of the polymers at the $2^{nd}$ land ring temperature of a turbocharged direct injection (TDI) engine. As seen in Table 3, the best performer was again PIB, followed very closely by both copolymers of the present invention. The lower styrenic content ATRP copolymer was again a better performer than the living cationic copolymer.

TABLE 3

Isothermal degredation pattern at 285° C.

| | % of remaining polymer after: | | | |
|---|---|---|---|---|
| | 200 min | 600 min | 1440 min | Rank |
| OCP | 51.7 | 39.2 | 34.4 | 4 |
| SBR | 68.9 | 64.7 | 61.2 | 5 |
| PIB | 0.17 | 0.13 | 0.11 | 1 |
| PS-PIB (living cat) | 1.67 | 1.29 | 1.07 | 3 |
| PS-PIB (ATRP) | 1.05 | 0.87 | 0.74 | 2 |

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:
  (i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);
  (ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);
  (iii) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. The products formed thereby, including the products formed upon employing lubricant composition of the present invention in its intended use, may not be susceptible of easy description. Nevertheless, all such modifications and reaction products are included within the scope of the present invention; the present invention encompasses lubricant composition prepared by admixing the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A lubricating composition comprising: an oil of lubricating viscosity and a block copolymer comprising at least one poly(isobutylene) (PIB) polymer block (block A) and at least one poly(vinyl aromatic) (PVA) polymer block (block B) with mole ratio of block A/(block A+B) of 0.5 to 0.97.

2. The composition of claim 1 wherein the PVA is poly(styrene) (PS).

3. The composition of claim 1 wherein the mole ratio of block A/(block A+B) is about 0.96.

4. The composition of claim 1 wherein the mole ratio of block A/(block A+B) is about 0.80.

5. The composition of claim 1 wherein block A comprises less than 10 mol % of a diene derived units.

6. The lubricating composition of claim 1, wherein the copolymer has a number average molecular weight of 1000 to 1,000,000.

7. The lubricating composition of claim 6, wherein the copolymer has a number average molecular weight of 10,000 to 250,000.

8. The lubricating composition of claim 1, wherein the copolymer is hydrogenated, and the hydrogenated copolymer has a polydispersity of 1 to less than 1.6.

9. The lubricating composition of claim 8, wherein the copolymer is hydrogenated, and the hydrogenated copolymer has a polydispersity of 1.01 to 1.4.

10. The lubricating composition of claim 1, wherein the copolymer is a diblock copolymer.

11. The lubricating composition of claim 1, wherein the copolymer is a sequential block copolymer.

12. A method of controlling deposits in lubricant compositions comprising adding to the lubricant composition a block copolymer comprising at least one PIB polymer block (block A) and at least one PVA polymer block (block B) with mole ratio of block A/(block A+B) of 0.5 to 0.97.

13. The method of claim 12 wherein the PVA polymer is poly(styrene).

\* \* \* \* \*